US009804378B2

(12) United States Patent
Singer et al.

(10) Patent No.: US 9,804,378 B2
(45) Date of Patent: Oct. 31, 2017

(54) ARRANGEMENT FOR LIGHT SHEET MICROSCOPY

(71) Applicant: Carl Zeiss Microscopy GmbH, Jena (DE)

(72) Inventors: Wolfgang Singer, Aalen (DE); David Shafer, Fairfield, CT (US); Artur Degen, Jena (DE); Jörg Siebenmorgen, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 0 days.

(21) Appl. No.: 15/036,460

(22) PCT Filed: Nov. 13, 2014

(86) PCT No.: PCT/EP2014/074489
§ 371 (c)(1),
(2) Date: May 13, 2016

(87) PCT Pub. No.: WO2015/071363
PCT Pub. Date: May 21, 2015

(65) Prior Publication Data
US 2016/0291304 A1    Oct. 6, 2016

(30) Foreign Application Priority Data

Nov. 15, 2013 (DE) .......... 10 2013 112 596

(51) Int. Cl.
*G02B 21/08* (2006.01)
*G02B 21/18* (2006.01)
(Continued)

(52) U.S. Cl.
CPC ............ *G02B 21/08* (2013.01); *G02B 13/18* (2013.01); *G02B 21/0032* (2013.01);
(Continued)

(58) Field of Classification Search
CPC .... G02B 21/08; G02B 13/18; G02B 21/0032; G02B 21/02; G02B 21/18; G02B 27/0025
(Continued)

(56) References Cited

U.S. PATENT DOCUMENTS 4,412,723 A    11/1983  Shafer
8,582,203 B2 *  11/2013  Dunsby .................. G02B 21/16
                                                        359/368
(Continued)

FOREIGN PATENT DOCUMENTS

DE         102 57 423         6/2004
DE    10 2013 107 297.6       1/2015
(Continued)

OTHER PUBLICATIONS

International Search Report for Application No. PCT/EP2014/074489 dated Feb. 16, 2015.
(Continued)

*Primary Examiner* — Frank Font
(74) *Attorney, Agent, or Firm* — Haug Partners LLP

(57) ABSTRACT

An arrangement for light sheet microscopy including illumination optics with an illumination objective for illuminating a sample, located in a medium on a sample carrier aligned with respect to a plane reference surface, with a light sheet. The arrangement also includes detection optics with a detection objective. The arrangement further includes a separating layer system with at least one layer separating the medium from the illumination and detection objectives. The separating layer system contacts the medium by a base surface aligned parallel to the reference surface. A correction lens system, with at least one correction lens serving to reduce those aberrations which occur as a result of the oblique passage of illumination light and/or of light to be detected through interfaces of the separating layer system, is (Continued)

arranged between illumination objective and separating layer system and/or between detection objective and separating layer system.

6 Claims, 4 Drawing Sheets

(51) Int. Cl.
  *G02B 21/02*   (2006.01)
  *G02B 27/00*   (2006.01)
  *G02B 13/18*   (2006.01)
  *G02B 21/00*   (2006.01)

(52) U.S. Cl.
  CPC ............. *G02B 21/02* (2013.01); *G02B 21/18* (2013.01); *G02B 27/0025* (2013.01)

(58) Field of Classification Search
  USPC ................... 359/372, 385, 398, 724
  See application file for complete search history.

(56) References Cited

U.S. PATENT DOCUMENTS

| | | |
|---|---|---|
| 2003/0001071 A1 | 1/2003 | Mandella et al. |
| 2004/0173760 A1 | 9/2004 | Kino et al. |
| 2011/0261446 A1* | 10/2011 | Dunsby ................. G02B 21/16 359/380 |
| 2015/0098126 A1* | 4/2015 | Keller ................ G02B 21/0076 359/385 |

FOREIGN PATENT DOCUMENTS

| | | |
|---|---|---|
| EP | 0 866 993 | 9/1998 |
| WO | WO 2004/053558 | 6/2004 |
| WO | WO 2012/110488 | 8/2012 |
| WO | WO 2012/122027 | 9/2012 |
| WO | WO 2015/004108 | 1/2015 |

OTHER PUBLICATIONS

J. Huisken et al. "Selective Plane Illumination Microscopy Techniques in Developmental Biology", published in 2009 in the journal Development, 136, pp. 1963-1975.

Victor J. Doherty et al., *"Simple Method of Correcting the Aberrations of a Beam Splitter in Converging Light"*, Proc. of SPIE vol. 0237, International Lens Design, ed. Fischer, May 1980.

Notification of Transmittal of Translation of the International Preliminary Report on Patentability for Application No. PCT/EP2014/074489 dated May 17, 2016.

* cited by examiner

ARRANGEMENT FOR LIGHT SHEET MICROSCOPY

The present application claims priority from PCT Patent Application No. PCT/EP2014/074489 filed on Nov. 13, 2014, which claims priority from German Patent Application No. DE 10 2013 112 596.4 filed on Nov. 15, 2013, the disclosures of which are incorporated herein by reference in their entirety.

FIELD OF THE INVENTION

It is noted that citation or identification of any document in this application is not an admission that such document is available as prior art to the present invention.

The invention is directed to an arrangement for light sheet microscopy. An arrangement of this kind comprises illumination optics with an illumination objective for illuminating a sample with a light sheet via an illumination beam path, this sample being located on a sample carrier in a medium. The sample carrier—occasionally also configured as sample vessel with side walls for receiving liquids—is aligned with respect to a plane reference surface. The optical axis of the illumination objective and the light sheet lie in a plane which forms an illumination angle β not equal to zero with the normals of the reference surface. Finally, the arrangement also comprises detection optics with a detection objective in a detection beam path. The optical axis of the detection objective forms a detection angle δ not equal to zero with the normals of the reference surface. Further, the arrangement includes a separating layer system with at least one layer made of a predetermined material with predetermined thickness which separates the medium from the illumination objective and the detection objective. The separating layer system is aligned with a base surface parallel to the reference surface and contacts the medium by this base surface at least in the region which is accessible to the illumination objective and the detection objective for illumination and detection. Finally, the arrangement also comprises a correction lens system with at least one correction lens serving to reduce those aberrations which occur as a result of the oblique passage of illumination light and/or of light to be detected through the interfaces of the separating layer system. Normally, the illumination objective and detection objective are two different objectives, but they can also be designed as a so-called double-objective such as is described, for example, in EP 0 866 993 B1 . In this case, the two objectives are put together in a shared constructional unit, and the respective optics—i.e., objectives with associated beam paths and optical elements arranged therein—share some elements.

A device of this type is used particularly in the examination of biological samples in which the sample is illuminated by a light sheet, the plane of which intersects the optical axis of detection at an angle not equal to zero. The light sheet typically forms a right angle with the detection direction which generally corresponds to the optical axis of the detection objective. Spatial recordings of even thick samples can be made relatively quickly with this technique, also referred to as SPIM (selective plane illumination microscopy). A graphic, spatially extensive representation of the sample is made possible based on optical sections combined with a relative movement in a direction perpendicular to the section plane.

The SPIM technique is preferably used in fluorescence microscopy, in which connection it is also referred to as LSFM (light sheet fluorescence microscopy). The LSFM technique has a number of advantages over other established methods such as confocal laser scanning microscopy or two-photon microscopy. Since widefield detection can be carried out, larger sample regions can be acquired. Although the resolution is somewhat lower than in confocal laser scanning microscopy, the LSFM technique can be used to analyze thicker samples because the penetration depth is greater. Further, this method has the least light stress on the samples, which, among other things, reduces the risk of photobleaching of the sample because the sample is only illuminated by a thin light sheet at an angle to the detection direction not equal to zero.

Both a static light sheet, which is generated, for example, by means of cylindrical lenses, or a quasistatic light sheet can be used. This quasistatic light sheet can be generated through fast scanning of the sample with a light beam. The light sheet-type illumination is brought about in that the light beam undergoes a very fast relative movement with respect to the sample to be observed and is thus strung together over and over in a temporally consecutive manner. The integration time of the camera on whose sensor the sample is ultimately imaged is selected such that the scanning is concluded within the integration time. Instead of a camera with a two-dimensional array, a line sensor combined with a renewed scanning (rescan) can also be used in the detection optics. Further, confocal detection can also be carried out.

The SPIM technique has been described numerous times in the literature, for example, in DE 102 57 423 A1 and in WO 2004/053558 A1 which is based on the latter, and in the survey article "Selective Plane Illumination Microscopy Techniques in Developmental Biology" by J. Huisken et al. published in 2009 in the journal *Development*, vol. 136, p. 1963.

One of the chief applications of light sheet microscopy is for imaging intermediate-sized organisms having a size of some hundreds of micrometers to a few millimeters. Generally, these organisms are embedded in an agarose gel which is located in turn in a glass capillary. The glass capillary is inserted from above or below into a sample chamber filled with water, and the sample is pushed some distance out of the capillary. The sample in the agarose is then illuminated by a light sheet, and the fluorescence is imaged on a camera by a detection objective oriented perpendicular to the light sheet and, therefore, also perpendicular to the light sheet optics.

This method of light sheet microscopy has three great disadvantages. For one, the samples to be examined are relatively large; they derive from developmental biology. Further, as a result of the sample preparation and the dimensions of the sample chamber, the light sheet is relatively thick and accordingly limits the attainable axial resolution. In addition, preparation of samples is uneconomical and is not compatible with standardized sample preparations or standardized sample holders commonly used in fluorescence microscopy for analyzing individual cells.

In order to circumvent these limitations at least partially, a SPIM construction was recently implemented in which the illumination objective and the detection objective are perpendicular to one another and are directed onto the sample from above at an angle of 45° in each instance. When, for example, the plane of a stage on which the sample holder is mounted or some other, usually horizontal, plane is used as reference surface, the illumination angle β and the detection angle δ are both 45°. A construction of this kind is described, for example, in WO 2012/110488A2 and WO2012/122027A2.

In constructions such as these, the sample is located, for example, on the bottom of a petri dish. The petri dish is filled with water, the illumination objective and detection objective are immersed in the liquid, and the water also takes on the function of an immersion liquid. This approach offers the advantage of higher resolution in axial direction, since a thinner light sheet can be generated. Smaller samples can then also be examined owing to the higher resolution. Sample preparation is also made significantly easier. Nevertheless, the sample preparation and sample holder still do not correspond to the standard currently applicable in fluorescence microscopy with individual cells. Accordingly, the petri dish must be relatively large so that the two objectives can be immersed in the dish without hitting the edge of the dish. Microtiter plates—also known as multi-well plates— which are standard in many branches of biology and are also used precisely in fluorescence microscopy analysis of individual cells cannot be used with this method because the objectives cannot be immersed in the very small wells arranged in grid shape on the plate. A further disadvantage consists in that it is not readily possible with this construction to analyze a large number of samples in a short period of time (high-throughput screening) because the objectives must be cleaned when changing samples in order to avoid contaminating the different samples.

One way to overcome these disadvantages is to maintain the configuration $\beta=\delta=45°$ on one side, but to direct the two objectives onto the sample not from above, but rather in the manner of an inverted microscope from below, where illumination and detection then take place through the transparent bottom of the sample vessel. This transparent vessel bottom together with the air layer located between the bottom and the objectives then forms the separating layer system. Detection can then continue from above in an equivalent manner provided the sample vessel is covered by a transparent cover or even without a cover of this kind, in which case the separating layer system comprises only an air layer. In this way, all typical sample vessels, for example, also microtiter plates, petri dishes and object carriers, can be used. In particular, a contamination of the samples can also be prevented in this way in case of high-throughput analysis.

However, this advantage comes at the cost of a further, severe disadvantage because, as a result of using the separating layer system, for example, the coverslip or vessel bottom with adjoining air layer, extreme imaging aberrations such as spherical aberrations, coma and astigmatism occur even at low numerical apertures NA of e.g., 0.3 because of the oblique passage through the separating layer system and, accordingly, correct imaging is no longer possible when using standardized objectives.

To overcome these disadvantages, it was suggested in DE 10 2013 107 297.6 to integrate correction means in the form of correction lenses or lens groups in the illumination objective and/or in the detection objective. Cylindrical lenses, lenses which are tilted relative to the optical axis or lenses which are not arranged axially are examples of the correction lenses suggested therein. The correction lenses also comprise elements with aspherical surfaces or free-form surfaces. Further, the materials used for the object carrier have approximately the refractive index of water and, further, adaptive optical elements for manipulating the phase fronts of the illumination light and/or detection light are suggested for eliminating further aberrations. In an article by Victor J. Doherty and David Shafer entitled "Simple Method of Correcting the Aberrations of a Beam Splitter in Converging Light" published in Proc. of SPIE, vol. 0237, International Lens Design, 1980 and in U.S. Pat. No. 4,412,723 which was based on this article, it is suggested that aberrations be corrected in the air during the oblique passage through a beamsplitter which can be regarded in this context as an object carrier.

SUMMARY OF THE INVENTION

It is the object of the invention to eliminate the imaging errors occurring when illumination light and detection light pass obliquely through the object carrier, the bottom of the sample vessel or a coverslip by means of a correction lens system which is as simple as possible and which in particular also enables continued use of existing objectives.

This object is met in an arrangement for light sheet microscopy of the type described above in that the correction lens system is arranged between illumination objective and separating layer system and/or between detection objective and separating layer system. This allows simple retrofitting of existing objective sets with the correction lens system which must be adapted to the respective coverslip that is used. The correction lens system can correct the imaging of water through the coverslip in water or air, for example. In this respect, it is sufficient to adapt the correction lens system only to the coverslip that is used; there need not necessarily be a special adaptation to utilized objectives, but this may be carried out in order to achieve an even better correction. The focusing can then take place, for example, in that the objective is moved together with the correction lens system axially along the normals of the reference surface, although the focusing of the objective can also be carried out through internal focusing, in which case there is no movement. The correction lens system is preferably rigidly connected to the objective and is moved with it. Insofar as it is not necessary to adapt to different objectives, the correction lens system can also be made available independently from the objectives and integrated, for example, in a holder provided for this purpose at the sample vessel, at the specimen stage or at some other suitable location on the microscope body.

In a preferred embodiment, the at least one lens of the correction lens system is arranged in the illumination beam path as well as in the detection beam path. Accordingly, in this case the same correction lenses are used for correcting the illumination beam path and the detection beam path. In this way, the quantity of utilized lenses can be decreased and both technical expenditure for production and assembly and costs are reduced. For example, the correction lens system can comprise a plurality of lenses with shapes resembling hemispheres; the lens surfaces need not necessarily be spherical, but rather can preferably even be aspherical or freely shaped.

In a further preferred embodiment, the arrangement for light sheet microscopy comprises a further detection objective in a further detection beam path, wherein the at least one lens of the correction lens system is also arranged in the further detection beam path. In this case, the two detection objectives and the illumination objective share one and the same correction lens system; alternatively, each of the systems can also have its own correction lens system. The optical axes of the three objectives then form with one another by pairs an angle of 90° and are inclined by 45° with respect to the normals of the reference surface which is defined, for example, by a plane in which the vessel base or coverslip is located. All three of the objectives serve alternately as illumination objective and the other two serve as detection objectives. A total image with a higher resolution in depth can then be determined by means of computer-aided correlation of individual images.

In another preferred embodiment, the correction lens system is configured to image the sample in a magnifying manner. Accordingly, in addition to correcting for the oblique passage of the illumination light or detection light, a magnified image is also generated. This has the advantage that the numerical aperture behind the correction element is reduced, which in turn makes it possible to use a detection objective with a lower numerical aperture, which allows greater working distances on the one hand and lowers requirements for correction somewhat on the other hand, since the imaging errors are especially noticeable in the outer areas of the lenses, i.e., particularly with higher numerical apertures.

Further, specially adapted embodiment forms of the correction lens system are indicated in the further dependent claims. For example, the correction lens system can be composed of two or more spherical and/or aspherical lenses or can also comprise only one lens in which one or both lens surfaces is/are aspherical.

It will be appreciated that the features mentioned above and those to be described hereinafter can be used not only in the indicated combinations but also in other combinations or individually without departing from the scope of the present invention.

DETAILED DESCRIPTION OF EMBODIMENTS

It is to be understood that the figures and descriptions of the present invention have been simplified to illustrate elements that are relevant for a clear understanding of the present invention, while eliminating, for purposes of clarity, many other elements which are conventional in this art. Those of ordinary skill in the art will recognize that other elements are desirable for implementing the present invention. However, because such elements are well known in the art, and because they do not facilitate a better understanding of the present invention, a discussion of such elements is not provided herein.

The present invention will now be described in detail on the basis of exemplary embodiments.

Figure 1:
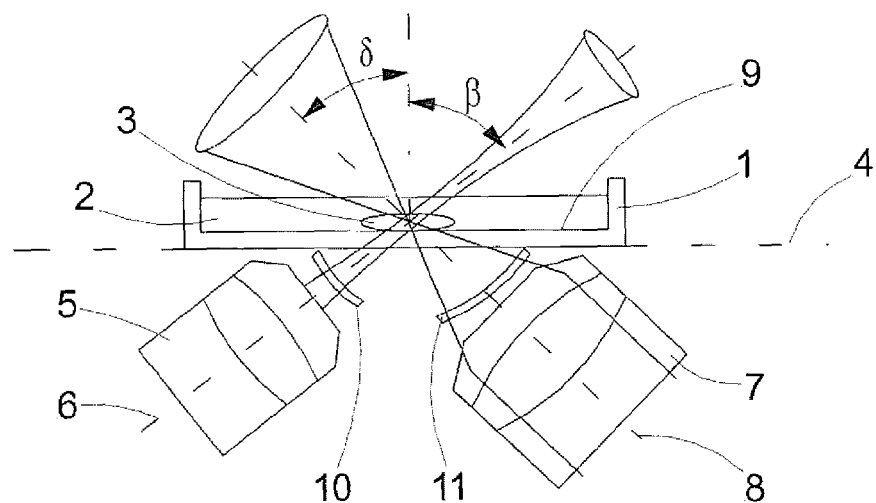
FIG. 1 shows the basic construction of an arrangement for light sheet microscopy with correction lens system.

First, FIG. 1 shows the basic construction of an arrangement for light sheet microscopy. This arrangement comprises a sample carrier formed as sample vessel 1, for example, as petri dish, for receiving a sample 3 located in a medium 2, for example, water or a nutrient solution. The sample vessel 1 is aligned with respect to a plane reference surface 4. This plane reference surface 4 is formed in this instance by the bottom of the sample vessel 1. Instead of the sample vessel 1, other sample carriers such as conventional object carriers in plate shape or high-throughput vessels such as microtiter plates can also be used. The arrangement for light sheet microscopy further comprises illumination optics with an illumination objective 5 for illuminating the sample 3 with a light sheet via an illumination beam path. The optical axis 6 of the illumination objective 5 and the light sheet lie in a plane which forms an illumination angle $\beta$ not equal to zero with the normals of the reference surface 4. The arrangement further comprises detection optics with a detection objective 7 in a detection beam path having an optical axis 8 which forms a detection angle $\delta$ not equal to zero with the normals of the reference surface 4. Finally, the arrangement also comprises a separating layer system with at least one layer made of a predetermined material with predetermined thickness which separates the medium 2 from the illumination objective 5 and the detection objective 7. The separating layer system has a base surface 9 which is oriented parallel to the reference surface and by means of which it contacts the medium 2 at least in the region which is accessible to the illumination objective 5 and the detection objective 7 for illumination and detection. In this instance, the separating layer system is formed of the vessel bottom, the thickness and material composition of which is known as a rule, and a further medium below the vessel bottom. This further medium can be air, but is preferably water or an aqueous solution, for example, a physiologic saline solution, filling the area between the vessel bottom and the lens of the correction lens system closest to the sample. The remaining area can also be filled with a further, liquid medium so that the correction lens system is located completely in this further medium. The latter is especially useful with liquid media when the objectives to which the correction lens system is coupled are immersion objectives. The base surface 9 is formed by the upper side of the vessel bottom facing the medium 2. Instead of the inverted configuration shown here, an upright configuration can also be used in which the separating layer system can comprise, inter alia, a cover in the form of a vessel lid for the sample vessel 1. A cover of this type can also be dispensed with; the base surface would correspond to the upper surface of the medium 2 in this case and the separating layer system would comprise only a water layer.

Finally, the arrangement for light sheet microscopy also comprises a correction lens system with at least one correction lens for reducing aberrations such as occur as a result of illumination light and/or light to be detected passing obliquely through interfaces of the separating layer system. The correction lens system is either arranged between the illumination objective and separating layer system or between the detection objective and separating layer system, or between the two objectives and the separating layer system depending on the resources for correcting the imaging errors. In this respect, the numerical aperture of the illumination objective is generally smaller than that of the detection objective so that corrections are preferably carried out in the detection beam path or in both beam paths. In the present case, the correction lens system is arranged between the illumination objective 5 and separating layer system as well as between the detection objective 7 and separating layer system. It comprises two individual correction lenses 10 and 11, a first correction lens 10 being arranged between the illumination objective 5 and the separating layer system and a second correction lens 11 being arranged between the detection objective 7 and the separating layer system. Correction lenses 10, 11 can have spherical surfaces, aspherical surfaces or free-formed surfaces. The correction lens system can also comprise a plurality of lenses per beam path.

Figure 2:
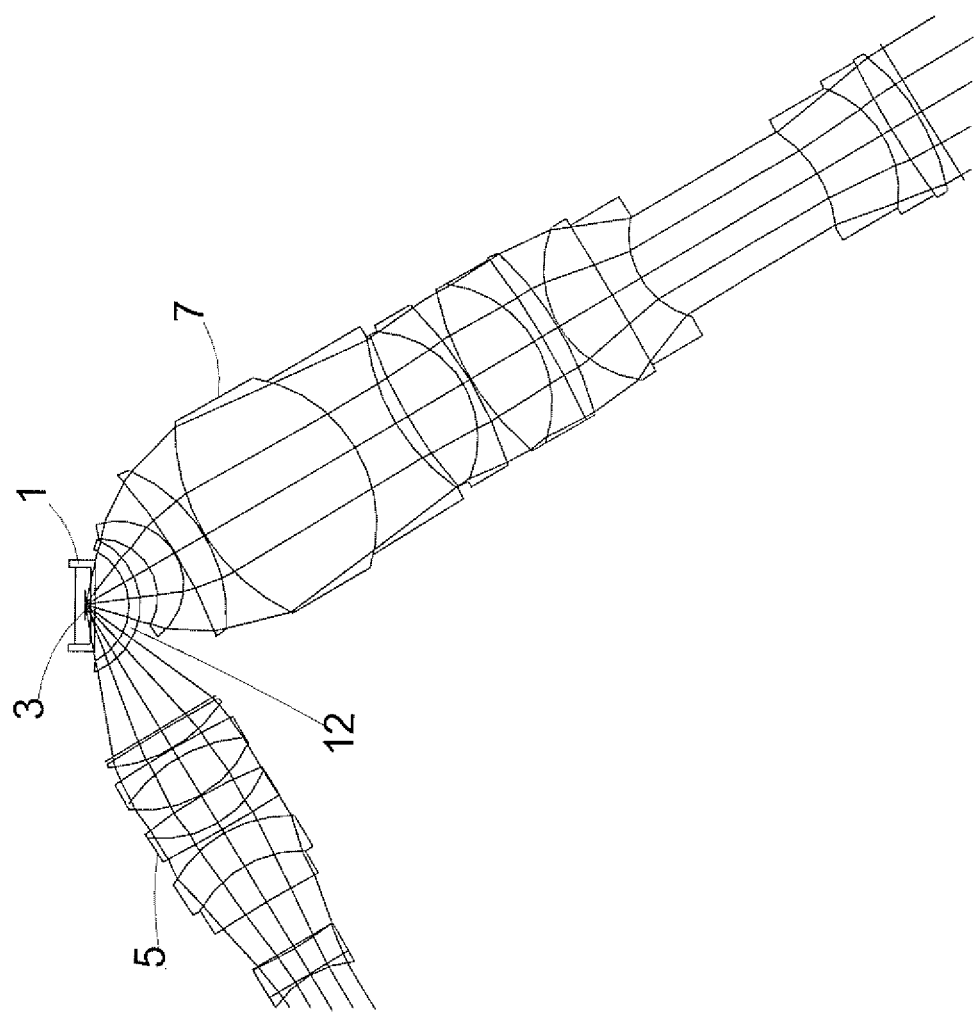
FIG. 2 shows a first special embodiment of an arrangement of this type.

In a particularly preferred embodiment which is shown in FIG. 2, a correction lens 12 is arranged in the illumination beam path and in the detection beam path. Accordingly, the illumination objective 5 and the detection objective 7 share the correction lens 12. One of the two surfaces of the correction lens 12 can be aspherical, for example. The numerical aperture of the illumination objective 5 is preferably 0.5. The numerical aperture of the detection objective 7 is preferably 1.0. The working distance between the sample and detection objective 7 is 8 mm. Since the illumination objective can be constructed more compactly, it is possible to arrange the detection objective at a smaller angle to the normals of the reference surface 4. In the present instance, this angle is 32°. The illumination light is then incident at a correspondingly larger illumination angle β=58° insofar as a rectangular configuration is to be retained, although this is not mandatory.

Figure 3:
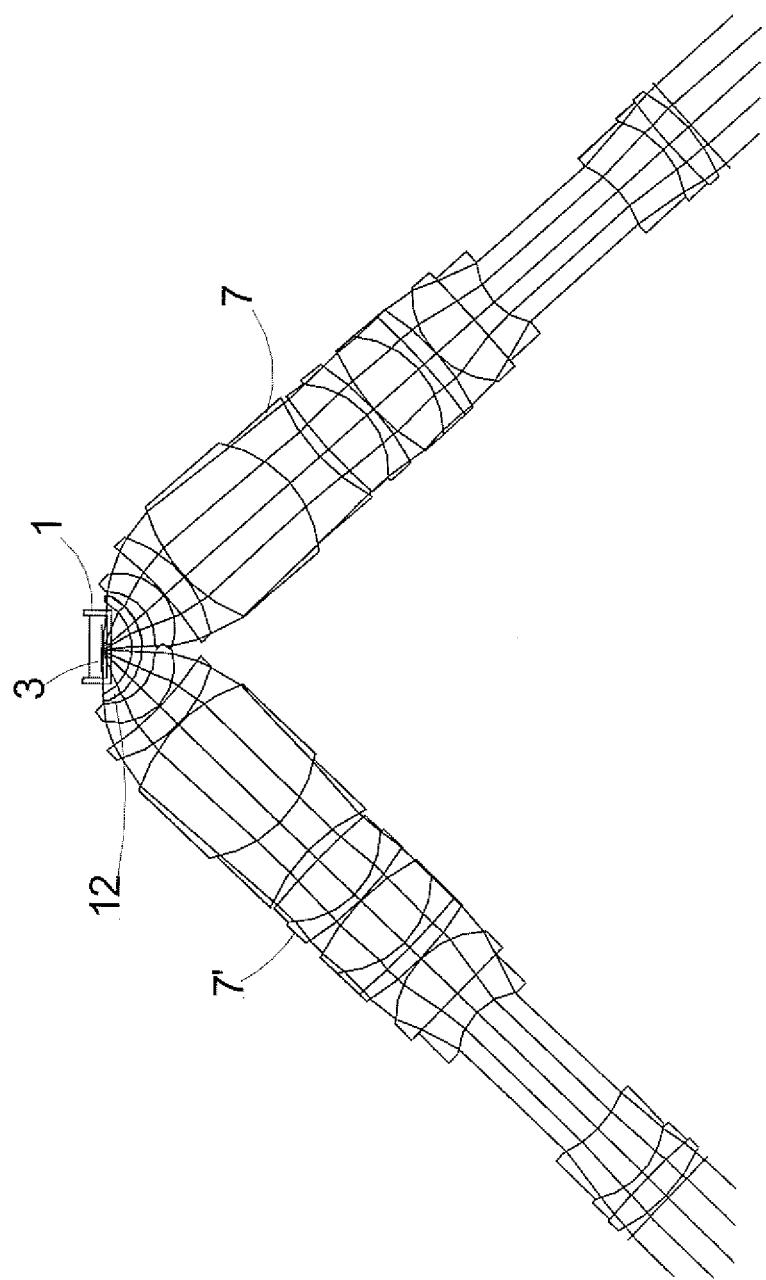
FIG. 3 shows another special embodiment of an arrangement of this type.

A similar configuration is shown in FIG. 3. The arrangement shown here comprises a further detection beam path with a further detection objective 7', and the correction lens 12 of the correction lens system is also arranged in the beam path. For the sake of clarity, the third identically constructed objective is not shown, but the correction lens 12 is also available for this objective. All three objectives serve alternately for illumination, and the two remaining objectives then serve for detection. One of the surfaces of the correction lens 12 can also be aspherical in this case. The working distance is 8 mm with a numerical aperture NA of 0.86 in water so that mechanical collisions can be prevented. Both detection objectives 7, 7' are identically constructed. Further, the correction lens system can be configured so as to image the sample in a magnifying manner when it images the sample in air and when using an air objective connected thereto. This makes it possible to reduce the numerical aperture precisely in this configuration in which a plurality of detection objectives 7, 7' are used.

Figure 4:
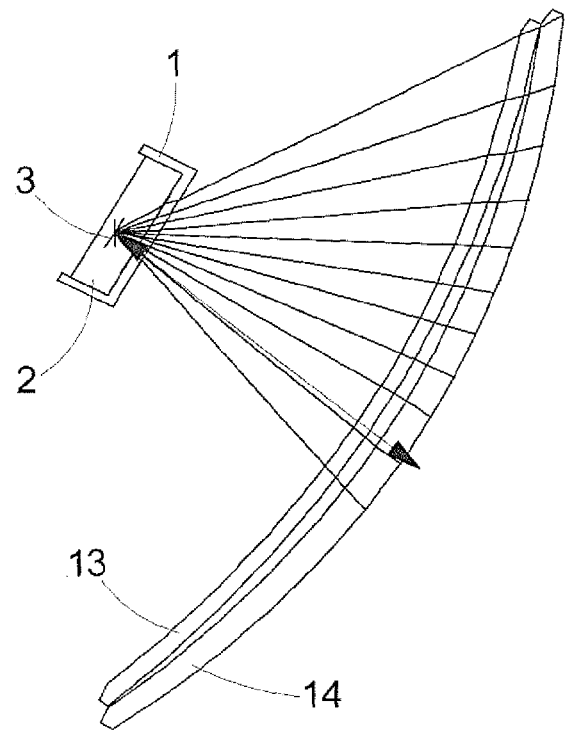
FIG. 4 shows a first correction lens system in detail.
Figure 5:
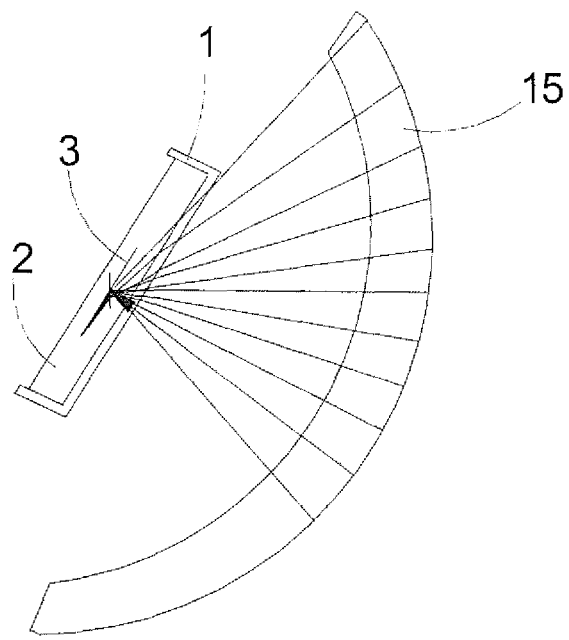
FIG. 5 shows a second correction lens system in detail.
Figure 6:
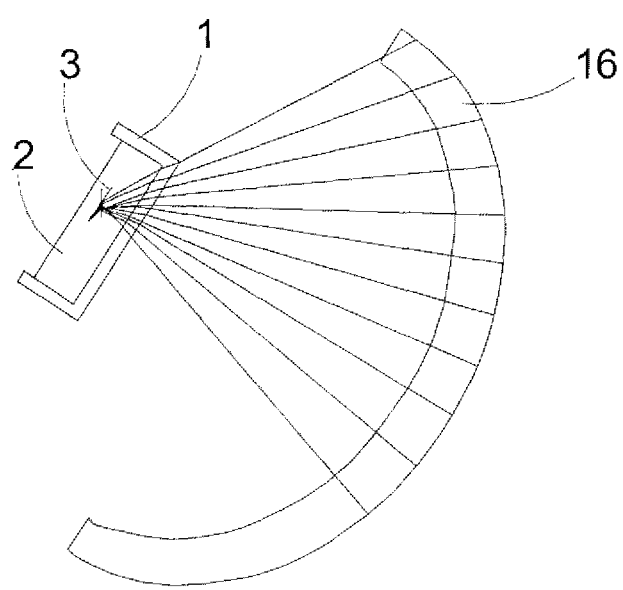
FIG. 6 shows a third correction lens system in detail.

FIGS. 4 to 6 show further configurations of correction lens systems which are optimized particularly with respect to the utilized materials and the thickness thereof in the separating layer system.

FIG. 4 shows a correction lens system which comprises two spherical lenses 13 and 14. The distance between the sample and the vertex of the lens 14 normal to the reference surface is 5.58 mm. In this connection, N-K5 crown glass with a thickness of 170 μm was used as material for the glass bottom of the sample vessel 1. At a wavelength $\lambda_e$=546.07 nm, the refractive index $n_e$ equals 1.5246 and the Abbe number $v_e$ equals 59.22. A particularly good correction results when the spherical lens 13 closer to the sample is fabricated from S-FPL53 glass with refractive index $n_e$=1.4399 and Abbe number $v_e$=94.49 and the spherical lens 14 facing the objective is made from N-FK5, marketed by Schott, and at a wavelength of $\lambda_d$=578.58 has a power $n_d$ of 1.48749 and an Abbe number $v_d$=70.41 and a refractive index $n_e$ of 1.4891 and an Abbe number $v_e$ of 70.23.

The four radii of the lens surfaces starting from the object side are $r_1$=−16.42 mm, $r_2$=−17.04 mm, $r_3$=−14.70 mm and $r_4$=−13.95 mm. This correction lens system is suitable particularly for use with the configuration shown in FIG. 2 in which the detection angle δ=32° and the numerical aperture NA of the detection objective is at least 1 in sagittal direction. The thickness of lens 13 is 0.27 cm, the thickness of lens 14 is 0.43 cm at the vertex in each instance. The correction lens system is configured to be used in water or in a physiologic saline solution. Both lenses are surrounded by water.

A further configuration of a correction lens system is shown in FIG. 5. The correction lens system in this case comprises an aspherical lens 15. This correction lens system is particularly suitable for use in a construction such as that shown in FIG. 2. The material and thickness are the same as those indicated referring to FIG. 4. The distance between the sample 3 and the outer lens surface facing the objective, which is also the aspherically formed surface, is 6 mm in this case. Borosilicate crown glass (BK7) with a refractive index $n_d$ of 1.5168 and an Abbe number $v_d$ of 64.17 was used as material for the lens. The radius of the spherical concave surface is r=−7.122 mm, the thickness in the vertex is 1.267 mm. The convex surface facing the objective is aspherical. The aspherical surface, in this case a rotationally symmetrical conic asphere, is described by the following relationship:

$$f(h) = \frac{\rho h^2}{1+\sqrt{1-(1+K)\cdot(\rho h)^2}} + \sum_{i=2}^{N} c_{2i} h^{2i}$$

where K is the conic constant, i and N are natural numbers, $c_{2i}$ denotes the coefficient of a polynomial in h. The relationship ρ=1/R applies for ρ, and R designates the radius of an imaginary conic surface at the vertex of this surface, i.e., the distance of the vertex from the closest focal point. In this respect, both the vertex and the focal points of the conic surface lie on the optical axis, where h designates the distance to the optical axis at which the value of function f(h) is determined, f is the distance of the lens surface from a plane perpendicular to the optical axis at the vertex of the conic surface at distance h from the optical axis. Coefficient $c_{2i}$, conic constant K and radius R are determined by iteration. In the present example, the value of the conic constant K is 0.11078 and the vertex radius is R=−8.0179 mm. Assuming a conventional lens height of about 30 mm, the following coefficients of the polynomial in h to i=3 results: $c_2$=2.705116·10$^{-5}$, $c_4$=6.481283·10$^{-9}$ and $c_6$=6.796660·10$^{-9}$.

Finally, FIG. 6 shows a further example of a correction lens system in which the correction lens used is configured as an aspherical lens 16. It is likewise suitable for use in a light sheet microscopy arrangement according to FIG. 2 in which the detection angle δ is 32° and the numerical aperture NA of the detection objective 7 is 1. In contrast to the example which was described referring to FIG. 5, both surfaces in the aspherical lens 16, the convex surface as well as the concave surface, are aspherical. The materials for the vessel bottom of the sample vessel 1 and the aspherical lens correspond to the materials that were already described referring to FIG. 5. The preferred distance between the sample 3 and the outer, convex surface of the aspherical lens is 5.49 mm. The concave aspherical surface has the following values: R=−5.294509, K=1.126334, $c_2$=−5.580368·10$^{-3}$, $c_4$=6.292423·10$^{-4}$ and $c_6$=−2.478332·10$^{-5}$. The convex aspherical surface has the following values: R=−5.806469, K=0.97766412, $c_2$=−3.220212, $c_4$=2.780769·10$^{-4}$ and $c_6$=−8.263956·10$^{-6}$.

While this invention has been described in conjunction with the specific embodiments outlined above, it is evident that many alternatives, modifications, and variations will be apparent to those skilled in the art. Accordingly, the preferred embodiments of the invention as set forth above are intended to be illustrative, not limiting. Various changes may be made without departing from the spirit and scope of the inventions as defined in the following claims.

LIST OF REFERENCE CHARACTERS 1 sample vessel
2 medium 3 sample
4 reference surface
5 illumination objective
6 optical axis
7, 7' detection objective
8 optical axis
9 base surface
10 correction lens
11 correction lens
12 correction lens
13, 14 spherical lens
15, 16 aspherical lens
β illumination angle
δ detection angle

The invention claimed is:

1. An arrangement for light sheet microscopy comprising:
illumination optics comprising:
an illumination objective configured to illuminate a sample with a light sheet via an illumination beam path, when the sample is located in a medium on a sample carrier that is aligned with respect to a plane reference surface;
wherein an optical axis of the illumination objective and the light sheet lies in a plane which forms an illumination angle not equal to zero with the normals of the plane reference surface;
detection optics comprising:
a detection objective in a detection beam path;
wherein an optical axis of the detection objective forms a detection angle not equal to zero with the normals of the reference surface;
a separating layer system comprising;
at least one layer made of a predetermined material with a predetermined thickness which separates the medium from the illumination objective and the detection objective;
wherein the separating layer system is configured to contact the medium by a base surface aligned parallel to the reference surface at least in a region which is accessible by the illumination objective and the detection objective for illumination and detection; and
a correction lens system comprising:
at least one correction lens configured to reduce aberrations that occur as a result of an oblique passage of illumination light, of light to be detected, or a combination thereof through interfaces of the separating layer system;
wherein the correction lens system is arranged between the separating layer system and the illumination objective, the detection objective, or both.

2. The arrangement according to claim 1:
wherein the at least one correction lens of the correction lens system is arranged in both the illumination beam path and the detection beam path.

3. The arrangement according to claim 1, further comprising:
a further detection beam path with a further detection objective;
wherein the at least one correction lens of the correction lens system is also arranged in the further detection beam path.

4. The arrangment to according to claim 1;
wherein the correction lens system is configured to image the sample in a magnifying manner to generate a magnified image.

5. The arrangement according to claim 1;
wherein the correction lens system comprising a first spherical lens and a second spherical lens;
wherein one of the first and second spherical lenses is the at leat one correction lens, or both of the first and second spherical lenses are different from the at least one correction lens.

6. The arrangement according to claim 1;
wherein the correction lens system comprises lens system comprises an aspherical lens with at least one aspherical surface;
wherein the aspherical lens is the at least one correction lens or is different from the at least one correction lens.

* * * * *